Sept. 16, 1941.  R. DAMIEN  2,256,426
PROCESS FOR MANUFACTURING TUBES
Filed May 25, 1939  6 Sheets-Sheet 1
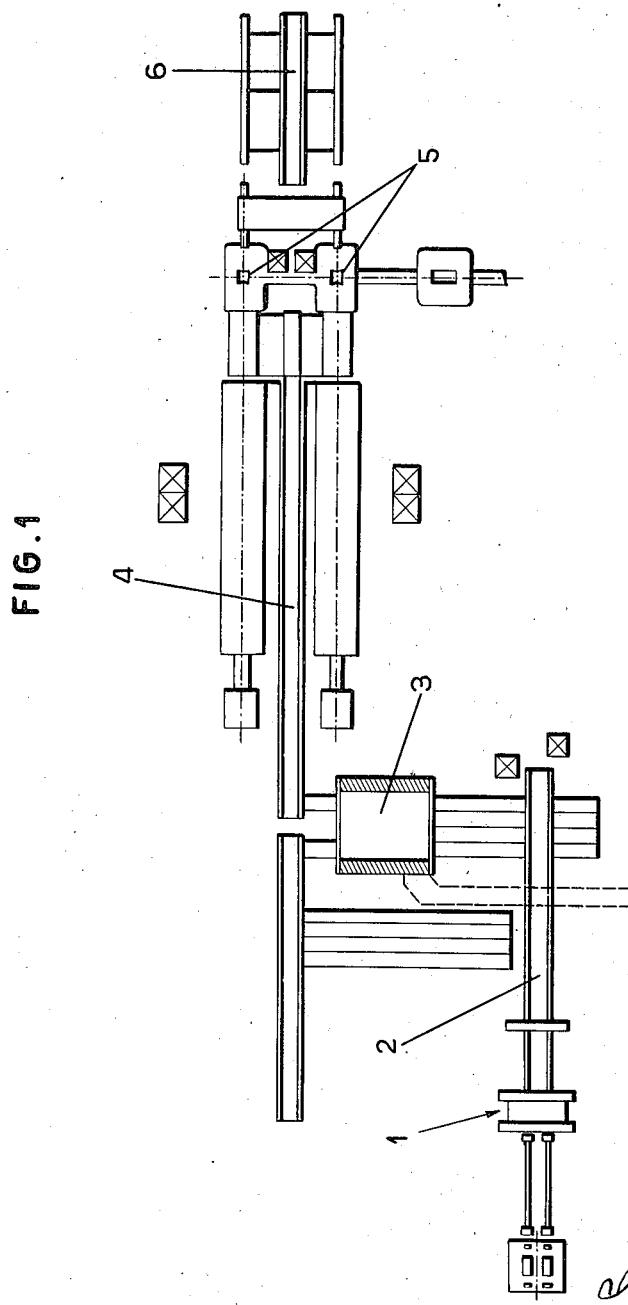

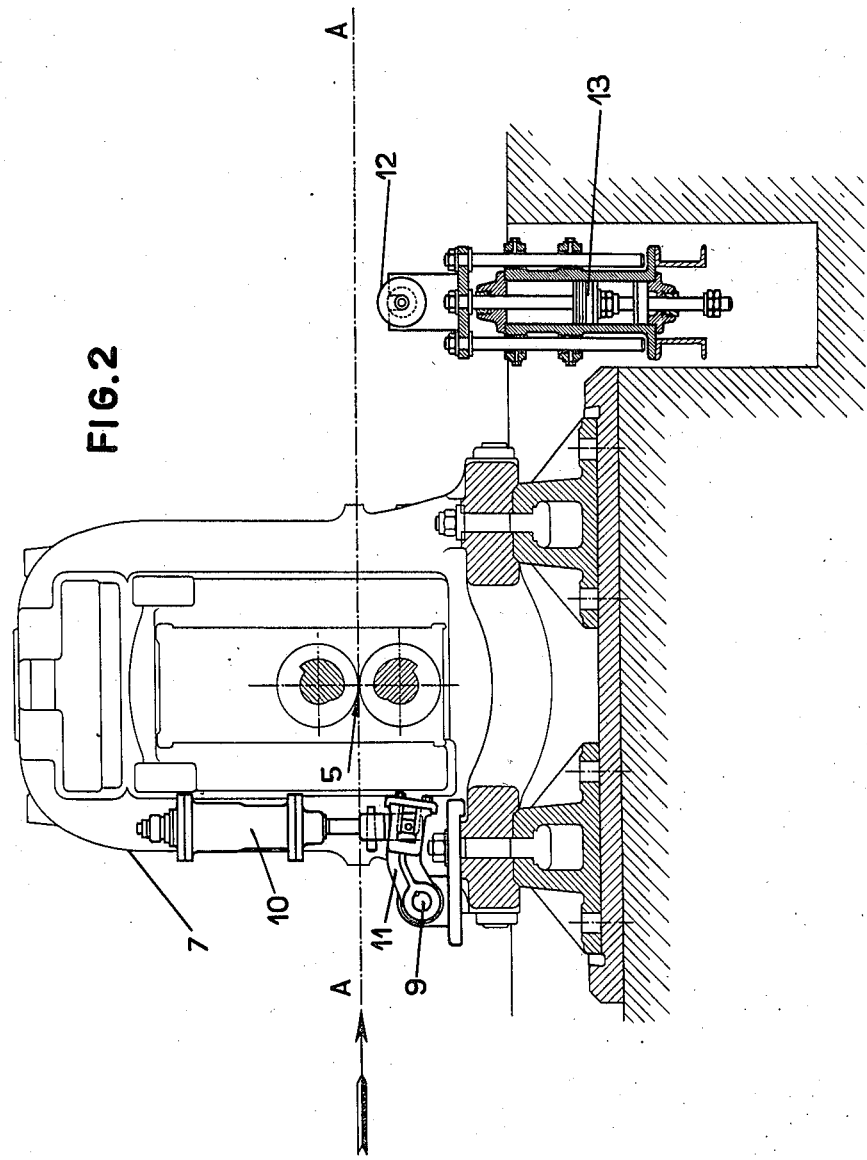

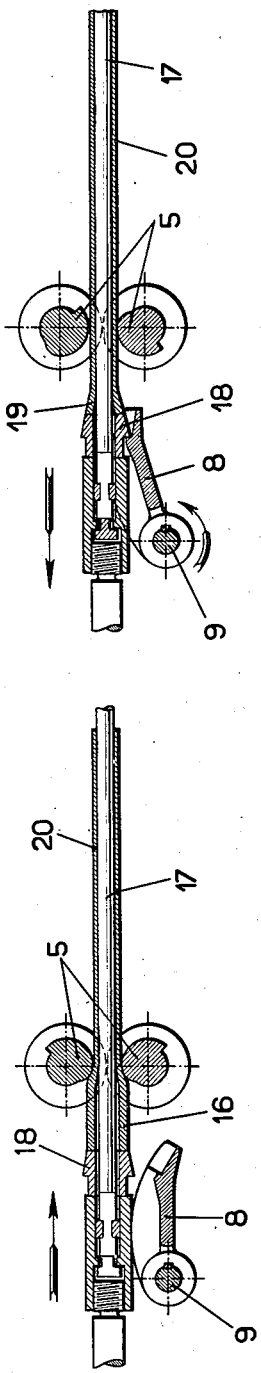
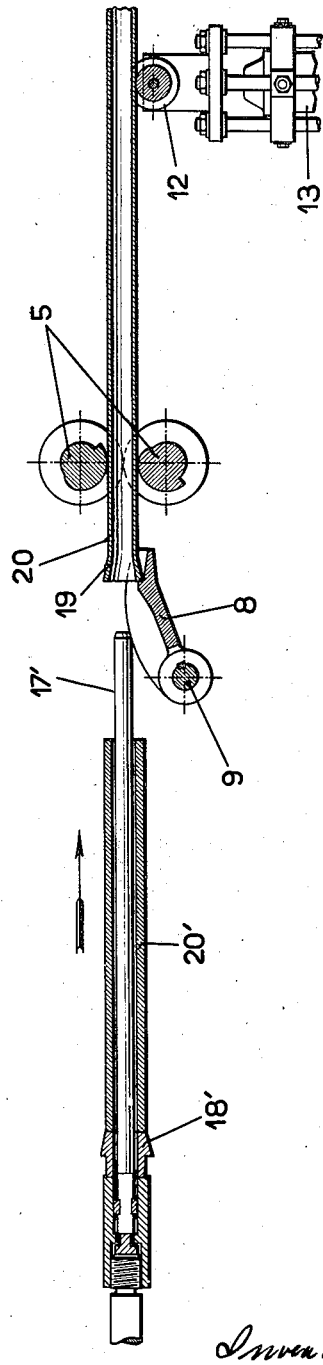

Sept. 16, 1941.　　　R. DAMIEN　　　2,256,426
PROCESS FOR MANUFACTURING TUBES
Filed May 25, 1939　　　6 Sheets-Sheet 4
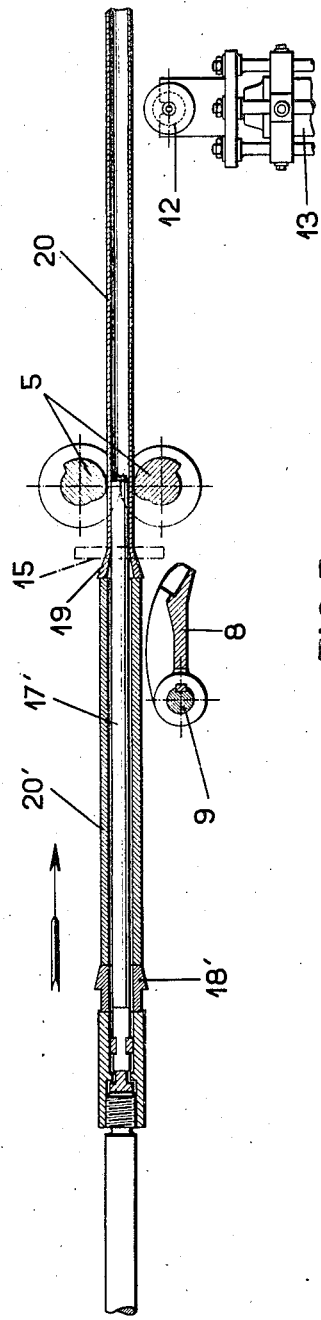
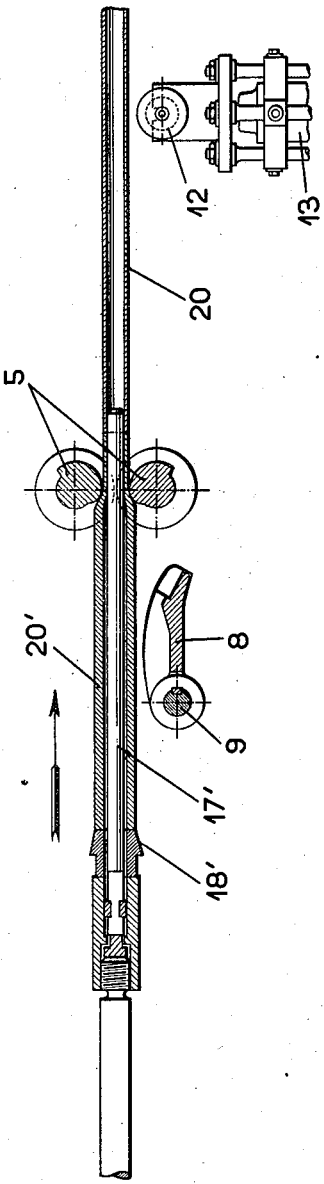

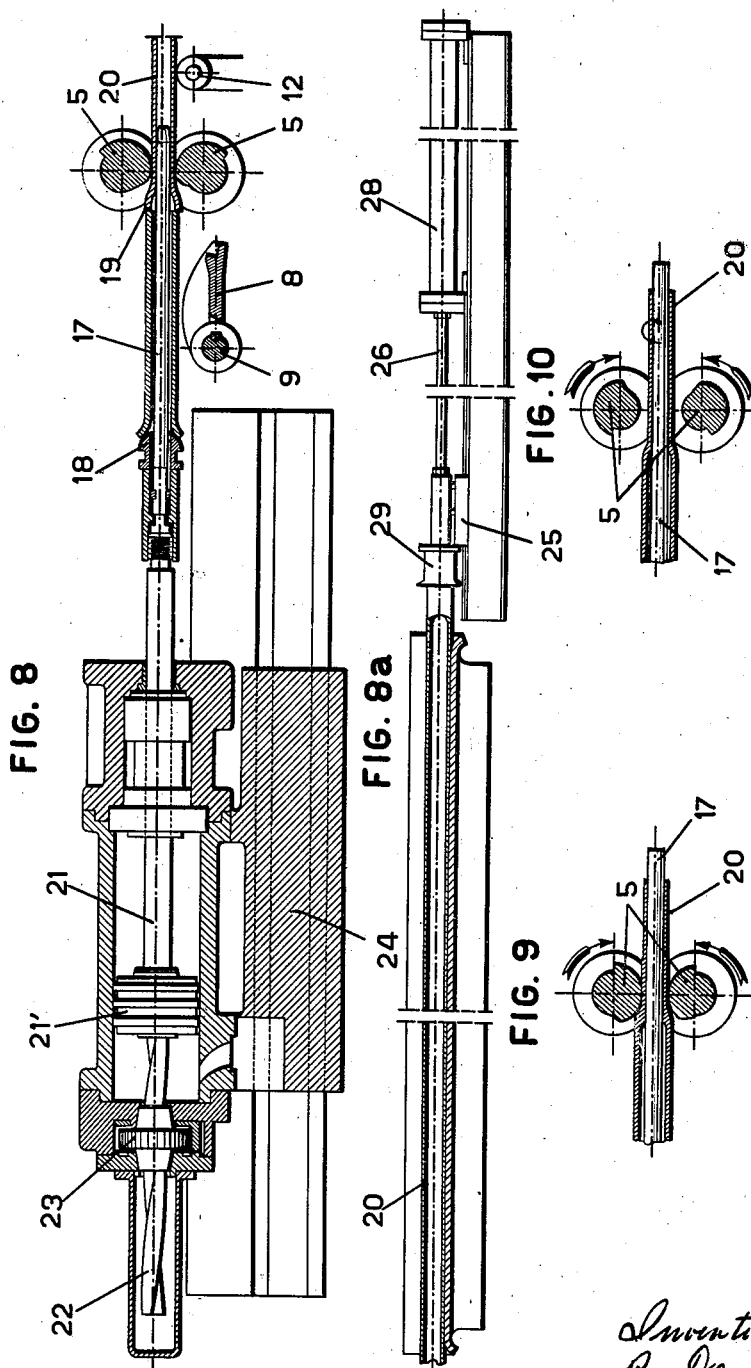

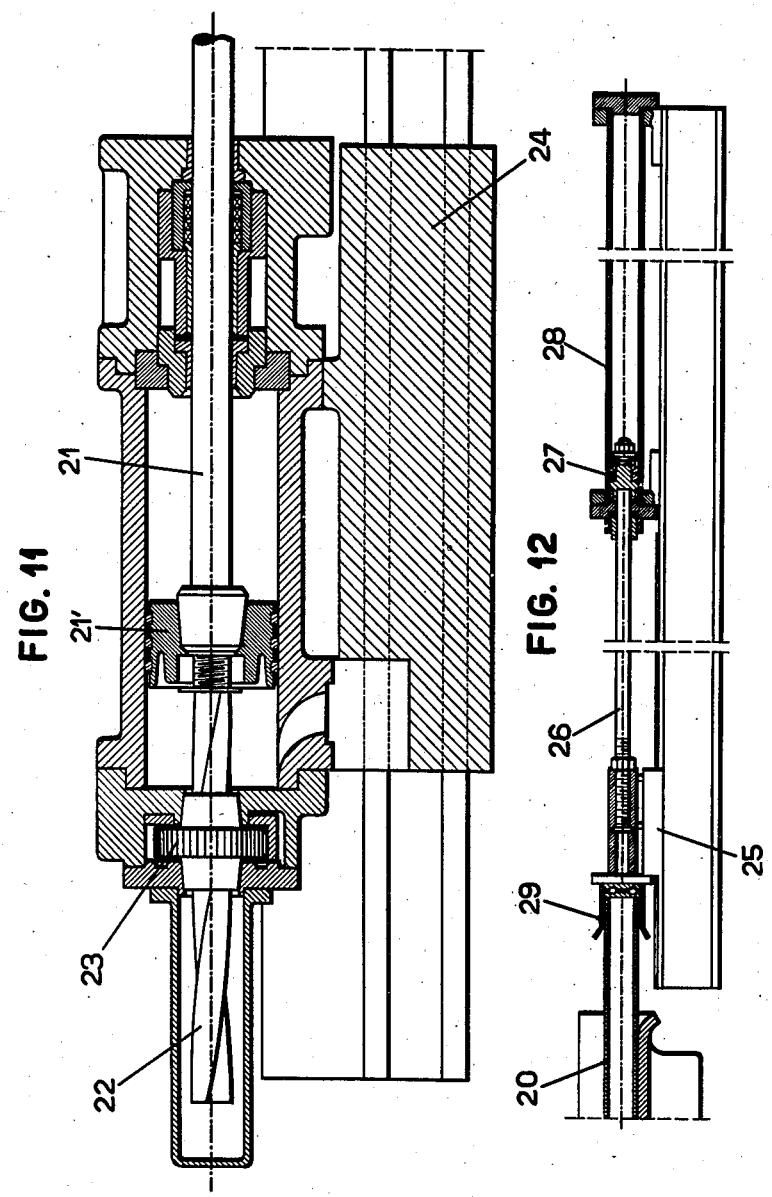

Patented Sept. 16. 1941

2,256,426

UNITED STATES PATENT OFFICE 2,256,426

PROCESS FOR MANUFACTURING TUBES

René Damien, Paris, France, assignor to Societe Anonyme des Tubes de Valenciennes et Denain, Valenciennes, France, a corporation of France Application May 25, 1939, Serial No. 275,741
In France March 25, 1939

1 Claim. (Cl. 80—62)

It is known that a process which is very frequently employed for manufacturing seamless tubes consists in pressing round bars on an oblique rolling mill called "piercer" and then passing these blanks through a pilgrim step rolling mill which converts them into tubes. When they leave the pilgrim step rolling mill, said tubes have a thicker part at one end, called "head," the presence of which is due to the fact that it is impossible to make the blank pass right up to its end between the rolls of the rolling mill.

In fact, while it is being rolled, said blank is stopped by a ring called a cap which is cold and cannot be rolled.

The head in question has to be cut off or "dropped" and this results in a considerable waste of metal, of the order of 6%.

The present invention has for its object an improved process for the manufacture of seamless tubes on a pilgrim step rolling mill, said process enabling, on the one hand waste of metal to be avoided owing to the complete rolling of the blank, and on the other hand the inertia effects of the tube carrying the head to be overcome.

In some rolling mills of a different type, from the pilgrim step one and in particular in rolling mills in which the rolls move with a reciprocating rectilinear motion, while the mandrel and the parts to be rolled remain stationary in the longitudinal direction, it has already been proposed to substitute for the aforesaid cap a hot abutment which can be rolled said hot abutment being formed by a second blank.

This manner of operating consisted in short in rolling two blanks on the same mandrel by means of the aforesaid rolling mills, the second blank pushing the first, thereby enabling the head of said first blank to be rolled; the rolling of the second blank only started at the actual instant when the rolling of the first blank finished.

Now it has hitherto not been possible to use this process on a pilgrim step rolling mill of the normal type in particular owing to the inertia effects of the tube carrying the head.

In fact, in the pilgrim step rolling mill of the normal type, the mandrel and the blanks it carries undergo a reciprocating motion imparted by the rollers and the piston secured to the mandrel.

Now, the movement of the latter, at the end of its return travel, is suddenly braked so that the tube having a head, which tube is located at the end of the mandrel, tends to be projected forwards.

This results in there being much more metal taken up than there should normally be and the part of the tube corresponding to the head is not at all satisfactory.

The process which is the object of the present invention enables these drawbacks to be overcome. According to the invention, the rolling of the two blanks fitted on the mandrel of the pilgrim step rolling mill is effected by exerting on the free end of the blank, which is the end opposite the head, a constant force which is capable of overcoming the inertia effect.

The application of this means, which forms an essential feature of the invention, enables the rolls of the pilgrim step rolling mill to be made to operate up to the end of the tube and, consequently, the head to be eliminated.

With this general means are associated other secondary means that have to be applied in order to effect the complete rolling of the tubes on a pilgrim step rolling mill.

It is obvious, in fact, that in order to obtain the desired result, the head to be rolled must still be at a suitable temperature. It is therefore requisite for the time necessary for changing the mandrel to be reduced to a minimum and, if necessary (for example when very thin tubes are being rolled), for it to be possible to keep the metal at a suitable temperature by means of an appropriate heating device.

It is also requisite for the hot blanks to be distributed to the rolling mill at the appropriate time.

The invention has also for its object an apparatus which serves for carrying out the process that has just been explained.

Said apparatus is essentially characterized by the combination with the piercing mill for producing blanks or thick and short hollow bodies and with the pilgrim step rolling mill:

(a) Of a small heating furnace which receives the blanks from the piercing mill and distributes them, at the required instant and at the suitable temperature, to the pilgrim step rolling mill;

(b) Of a lever arranged at the entrance of the roll housing, which lever serves as a support for the pusher cap and the head of the tube when removing the mandrel and also as a support for said tube in the rolling axis while the free end of the mandrel is being introduced after the blank which will subsequently produce the thrust has been placed in position;

(c) Of a roller which is arranged at the outlet of the roll housing and is brought, by the rod of a pneumatic piston, into a position in which it contributes to keep the tube in the rolling axis;

(d) In the case of rolling thin tubes, of a collar for re-heating the head;

(e) Of a device enabling the mandrels to be changed very quickly; and (f) Of a group of members which enable the inertia effects of the tube provided with the head to be overcome.

In the accompanying drawings, an embodiment of the essential elements of the above referred to apparatus has been shown quite diagrammatically and by way of example:

Fig. 1 is a diagrammatical plan view on a small scale, of the part of the plant in which the process is carried out;

Fig. 2 is an elevational view, in partial section, of the roll cage of the pilgrim step rolling mill and of the associated apparatus.

Fig. 3 shows the rolling of a blank slightly before the instant when the operation will have to be stopped owing to the presence of the head.

Fig. 4 shows the beginning of the operation for removing the blank of Fig. 3 from the mandrel.

Fig. 5 shows the state of the elements at the instant when another blank has been fitted on the mandrel and the mandrel is about to be introduced into the first blank.

Fig. 6 shows the resumption of the rolling of the first blank which is pushed by the one that has just been fitted on to the mandrel.

Fig. 7 shows the completely rolled tube and the following blank, which has just pushed it, being in turn subjected to rolling.

Figs. 8 and 8a show a vertical diagrammatical section of a pilgrim step rolling mill provided with the pneumatic abutment device.

Figs. 9 and 10 are diagrams showing the position of the rolls which respectively corresponds to the backward and to the forward movement of the blank.

Fig. 11 is a view on a larger scale of the device for controlling the mandrel during the rolling operation.

Finally, Fig. 12 is a view, in vertical section and on the same scale, of the pneumatically controlled abutment device which is intended to exert its constant force on the end of the tube opposite the head to be rolled.

As can be seen in Fig. 1, the blanks which are shaped on the piercing mill 1 are conveyed by the conveyor 2 to the heating furnace 3 in which they are temporarily stored at the same time as they are heated and raised to the suitable temperature for rolling. In the present process, it is necessary to start the rolling operation on hotter blanks than in the usual process.

The heating furnace 3 furthermore acts to some extent as a storage unit for making the operation and the output of the plant regular. If the operation of the piercing mill were to be disturbed, the store of hot blanks contained in the furnace enables the pilgrim step rolling mill to be supplied uninterruptedly. On the other hand, if a delay occurs in the rolling, the blanks accumulate in the furnace. In other words, the furnace is filled by the piercing mill when there is a delay in the rolling of the tubes and it is emptied by the pilgrim step rolling mill when there is a delay in the output of the piercing mill and thus the continuity of operation of the plant is ensured.

The blanks are conveyed by the conveyor 4 to the pilgrim step rolling mill 5. The finished tubes are conveyed by the conveyor 6 to the saw, to the truing machine, etc.

To thoroughly understand the operation of the improved apparatus which is the object of the present invention, it is useful to have reference to the method of operation of the pilgrim step rolling mill to which the said apparatus applies.

The blank which is used for the rolling operation is raised to a suitable temperature and is fitted on a mandrel 17 (Fig. 8) carried by a piston rod 21 under pressure. As previously mentioned, said blank bears on a cold cap 18. The rod 21 is extended rearwardly by a device comprising a very large pitch screw 22 and a ratchet wheel 23 which enables it to effect a quarter of a revolution for each longitudinal displacement.

This arrangement is supported by a hydraulically actuated carriage 24. The rolls of the rolling mill 5 rotate in opposite directions and in cross-section are shaped, like cams. It is obvious that the carriage 24 which moves with a slow and continuous motion will place the blank in contact with the rolls which, during the rolling operation, impart to it a backward motion (see Fig. 9).

Said backward motion continues so long as the part of the cam is operative, but as this action is no longer exerted, the blank is projected forwards and rotates a quarter of a revolution, as can be seen in Fig. 10.

This reciprocating movement which is imparted by the rolls and the piston 21' (Fig. 8) is imparted to the mandrel 17 (Fig. 8) and to the blanks carried by same, and at the end of its return travel, said mandrel is suddenly braked so that the tube provided with a head and which is located at the end of the mandrel, tends to be projected forwards.

It is in order to avoid the detrimental repercussion of these inertia effects on the rolling of the head that the pilgrim step rolling mill has been provided with the device shown on an enlarged scale in Fig. 12. Opposite the free end of the tube 20 which has a head and is mounted on the mandrel 17 (Fig. 8), an abutment system 29 has been arranged having a pneumatic control which is composed of a small carriage 25 placed at the end of a rod 26 secured to a piston 27 which moves under pressure in a cylinder 28.

The cross-section of said cylinder is such that the effect exerted on the piston 27 is always definitely less than that which acts on the rod 21, but is of such a nature as to overcome the inertia of the tube carrying the head and tends to hold it on the mandrel when same is braked at the end of its travel.

Another characteristic peculiarity of the apparatus which is the object of the invention consists in a lever 8 which is mechanically actuated and is arranged at the entrance of the roll housing of the rolling mill 5 (see Fig. 7); said lever is adapted to replace the more usual form of gripping means. In the embodiment shown, said lever 8 (Figs. 3 to 6) is fixed on the shaft 9 and is actuated by a pneumatic or hydraulic cylinder 10 (Fig. 2) through the transmission 11. This arrangement permits of an increase in the speed of the movements for removing the mandrels and for placing in position the blanks which serve to push the tubes during the rolling operation, which blanks are in turn subsequently rolled.

The lever 8 serves two purposes:

In the first place, it acts as an abutment for removing from the mandrel (Fig. 4) the tubes still carrying their head.

In the second place, it supports the tube (Fig. 5) in the rolling axis A—A (Fig. 2) between the rolls 5 in such a manner that, when the mandrel returns carrying the second blank, said mandrel readily engages in the head of the first blank.

At the outlet of the roll housing is arranged a roller 12 mounted on a rod of a pneumatic piston 13 which enables it to be brought to the required height for it to support the tube in the rolling axis A—A while the free end of the mandrel is being introductd (Fig. 5).

The control of the lever 8 and that of the roller 12 are so adjusted as to cause the lever and the roller to be retracted when the rolling operation is resumed (Fig. 6).

When thin tubes are rolled, as the head does not have sufficient retained heat, it may be necessary to re-heat it before resuming the rolling operation. For this purpose, a re-heating gas ring 15 is provided which can be operated during the period of stopping of the rolling operation corresponding to the change of mandrels.

The rolling of tubes without a head on a pilgrim step rolling mill will now be described, the various operations being shown diagrammatically in Figs. 3 to 7:

First of all a tube is rolled by the usual method (Fig. 3), the blank 16 which is fitted on the mandrel 17 being pushed by a cap 18, the head is formed as usual and when it is no longer possible to continue the rolling operation any further, it is stopped but without withdrawing the tube 20 from the roll housing.

The mandrel is then quickly removed, the cap 18 being held by the lever 8 which has placed itself in the position shown in Fig. 4. At the same time, the roller 12 has come into the position of Fig. 5 and supports the front end of the tube 20.

As soon as the mandrel has been completely withdrawn from the tube 20 and from the cap 18, the same ceases to be supported and falls; the lever 8 immediately supports the rear end of the tube 20 which is thus perfectly held in the rolling axis by the combined support of the lever 8 and of the roller 12, as can be seen in Fig. 5.

A fresh mandrel 17' is then engaged on the new blank 20' to be rolled, the free end of the mandrel being introduced into the incompletely rolled tube 20 which has remained between the rolls 5 (Fig. 5). This introduction is effected without difficulty owing to the fact that the said tube is held in the rolling axis by the lever 8 and by the roller 12. It should be noted on the other hand that the mandrel used is of greater length than the blank, as is the common practice.

When the mandrel 17' has been introduced into the rear part of the tube 20 (Fig. 5) the lever 8 and the roller 12 are retracted while the carriage 25 (Figs. 8a and 12) exerts its constant force on the end of the tube 20 opposite the head to be rolled.

When said head is passed between the rolls and the forging of the fresh blank has been started, the carriage 25 is suddenly returned to its starting position by the operation of an appropriate device.

The completely rolled tube is pushed by the following one, becomes disengaged from the mandrel and is ejected from the channel which contains it.

A complete rolling of the tube is thus effected on a pilgrim step rolling mill.

The blank 20' is in turn converted into a headless tube by the same sequence of operations which take place consecutively and form an uninterrupted cycle.

It is of course obvious that the particular method of carrying out the above described process, and also the constructional details of the apparatus, have only been given by way of example and that modifications could be made both in the process and in the apparatus without the general system of the invention being altered thereby.

What I claim is:

A process for manufacturing seamless tubes without a head on a pilgrim step rolling mill comprising rolling two blanks on the same mandrel, the second blank pushing the first, thereby enabling the head of said first blank to be rolled, and exerting on the free end of the first blank, which end is opposite to the head, a constant force adapted to overcome the inertia effect of said blank.

RENÉ DAMIEN.